United States Patent [19]

Mittelhäuser

[11] Patent Number: 4,469,406
[45] Date of Patent: Sep. 4, 1984

[54] REAR-VIEW MIRROR FOR A MOTOR VEHICLE

[76] Inventor: Bernhard Mittelhäuser, No. 57, 3002 Wedemark 2, Fed. Rep. of Germany

[21] Appl. No.: 375,822

[22] Filed: May 7, 1982

[30] Foreign Application Priority Data

May 8, 1981 [DE] Fed. Rep. of Germany ....... 3118245

[51] Int. Cl.³ .............................................. G02B 7/18
[52] U.S. Cl. ..................................... 350/307; 248/484
[58] Field of Search ................ 350/307, 288; 248/484, 248/487

[56] References Cited

FOREIGN PATENT DOCUMENTS

| 1233294 | 1/1967 | Fed. Rep. of Germany | ...... 350/288 |
| 1276484 | 8/1968 | Fed. Rep. of Germany | ...... 350/288 |
| 2628873 | 1/1978 | Fed. Rep. of Germany | ...... 350/307 |
| 2848414 | 7/1980 | Fed. Rep. of Germany | ...... 350/307 |
| 3020307 | 12/1981 | Fed. Rep. of Germany | ...... 350/307 |

*Primary Examiner*—Jon W. Henry
*Attorney, Agent, or Firm*—Becker & Becker, Inc.

[57] ABSTRACT

A motor vehicle rear-view mirror, having a shell-shaped housing with an opening directed counter to the direction of travel, and having a mirror body adjustably arranged in the opening, which is substantially closed thereby. A control lever having a handle projects into the vehicle passenger compartment and is mounted by means of a ball joint in such a way that the control lever can be rotated about its longitudinal axis for adjusting the mirror body about a horizontal axis, and additionally can be pivoted for adjusting the mirror body about a vertical axis. The control lever, at the mirror end thereof, has a bend terminating in a ball joint socket arrangement, so that a plate mounted therewith is movable back and forth about a shaft fixed to outer ends of arms of a pivot lever pivotally mounted on a mounting support behind the mirror body. A pin projects to one side of the mirror body toward the vehicle, and is limited in movement by an elongated hole formed by an extension of the base of the housing. A bellows along with hinged or folding shafts near the top and bottom thereof is arranged between the vehicle shell and the mirror housing. A moment or motion is introduced into the plate via the bend and a rotation of the control lever; the moment leads to a pivoting of the mirror body about a horizontal axis, i.e. to a pitching movement of the mirror body. The transfer of the pivot path of the bend is hereby assured through the noted ball joint connection, which in turn establishes the connection to the hinged plate.

4 Claims, 2 Drawing Figures

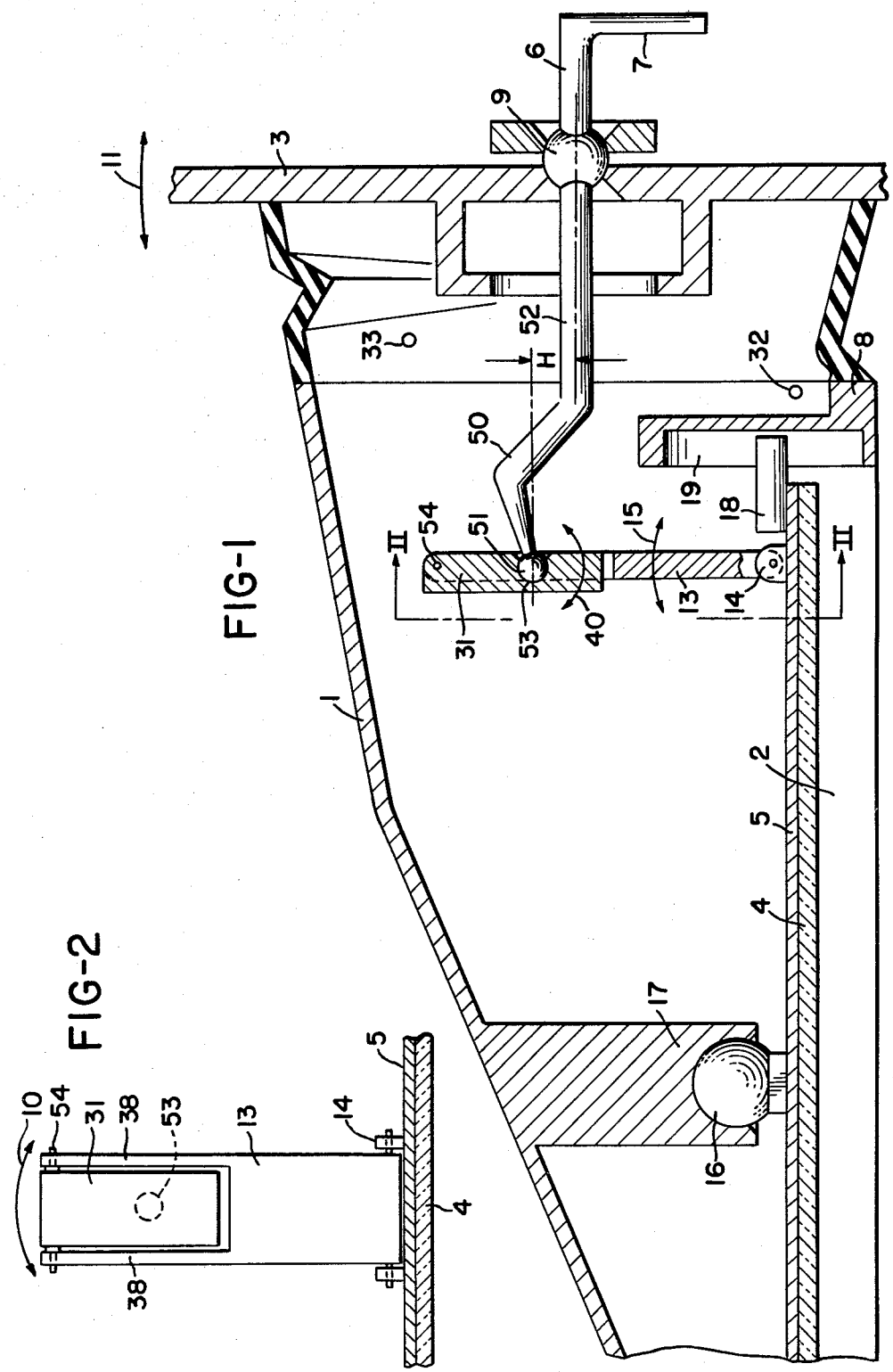

REAR-VIEW MIRROR FOR A MOTOR VEHICLE

The present invention relates to a rear-view mirror which is operable from the interior of a vehicle and is adjustable about a horizontal axis and a vertical axis via a control lever pivotable about a transverse axis and a longitudinal axis. The mirror body is pivotable about a vertical axis and about a horizontal axis via a ball joint located in a region remote from the vehicle, and via a pin, and a slot or elongate hole which the pin penetrates, at that end closest to the vehicle. That end of the control lever closest to the mirror body is articulated or hingedly connected with a plate hingedly connected with a pivot lever serving for moving the mirror body; in particular, the pivot lever is pivotable by rotating the control lever, and the angular position between the pivot lever and the control lever is variable by pivoting the control lever.

According to German patent application No. P 28 48 414.2, the transfer is motion from the control lever onto the pivot lever is effected by a ball-end-like construction at the free end of the control lever. However, to facilitate the swinging of the mirror in or counter to the travel direction, according to German patent application No. P 30 20 307.7, provision is made to equip the free end of the control lever with a plate directed at or approximately at right angles to this lever; the plate is articulated or pivotally connected with the pivot lever in such a manner that the plate can carry out movements which are at least approximately at right angles relative to the pivot lever. As a result, the pivot axes of the pivot lever (relative to the mirror body) and of the plate (relative to the pivot lever) extend at least approximately parallel to each other.

The head of the control lever is serrated in order to be able to effect a pivot movement of the mirror body about a horizontal axis under these conditions. This serration or tooth construction engages in a serration or tooth construction of an elongated hole of the plate.

It is an object of the present invention to further improve the articulated connection between the free end of the control lever, and the plate, and in addition to simplify this connection.

This object, and other objects and advantages of the present invention, will appear more clearly from the following specification in connection with the accompanying drawing, in which:

FIG. 1 is a horizontal cross section through one embodiment of an inventive external mirror mounted on a vehicle; and FIG. 2 shows a partial section taken along line II—II in FIG. 1.

The mirror according to the present invention is characterized primarily in that the free end of the control lever, i.e. that end closest to the mirror body, is bent and is connected with the plate via a ball-joint.

A motion is introduced into the plate via the bend and a rotation of the control lever; the motion or moment leads to a swinging or pivoting of the mirror body about a horizontal axis, i.e. to a pitching movement of the mirror body. The transfer of the pivot path of the elbow or bend is thereby assured although the mentioned ball-joint connection, which in turn establishes the connection to the hinged plate.

According to specific features of the present invention, in the normal position of the mirror body and of the control lever (FIG. 1), the control lever is bent away from the mirror body.

The ball socket may be located in the plate, while the free end of the control lever may be spherically constructed.

The ball joint connection may have a strength (pull resistance) which maintains the pivot connection yet makes possible a tilting or swinging away of the housing rearwardly and forwardly.

Referring now to the drawing in detail, the dish- or shell-shaped housing 1, with its opening 2 directed counter to the forward direction of travel, is fastened to the shell or outer covering 3 of the vehicle. An adjustably arranged mirror body 4 is located in the opening 2; this mirror body 4 essentially closes the opening 2. The mirror body 4 is fastened to a flat holder or mounting support 5, which is engaged by adjustment elements and bearing or support elements.

A control lever 6 having a handle 7 projects into the vehicle and, by means of a ball joint 9, is mounted in such a way that it can rotate about its longitudinal axis in the direction of the arrow 10 (FIG. 2) for adjusting the mirror body 4 about a horizontal axis, and also in such a way that it can be pivoted in the direction of arrow 11 for adjusting the mirror body 4 about a vertical axis.

A ball 16 is located on that end of the mounting support 5 remote from the vehicle for receiving a socket member 17 which is rigidly mounted to the surface of the housing 1. The ball 16, together with the socket member 17, forms a ball joint or ball pivot having a pivot axis that lies very close to the plane formed by the mirror body 4.

That end of the mirror body 4 closest to the vehicle is provided with a pin 18 which is located in or practically in the extension of the transverse center line of the mirror body 4. The pin 18 rests in a slot or oblong hole 19 having a width and horizontal extension corresponding to the pin diameter. This slot 19 is located at the base 8 of the housing and allows transverse shifting of the pin 18 in the direction of the slot 19, yet, independently of the position of the pin 18 in the slot 19, allows pivoting of the mirror body 4 about a horizontal axis (transverse central axis) of the mirror body 4.

Hinged or folded shafts are additionally provided. These vertically extending shafts make it possible to swing or tilt the housing 1, with its contents, either counter to or in the direction of travel if, during accidents or the like, the mirror is affected.

The following features are provided in order to make possible this escape movement, although additionally assuring that the operative connection between the control lever 6 on the one hand and the mirror body 4 on the other hand is not disconnected or eliminated:

The back of the mounting support 5, at that end closest to the vehicle, is equipped with a pivot lever 13 which is connected with the support 5 via a pivot joint 14 having an axis parallel to the plane of the mirror body 4; consequently, the pivot lever 13 can be pivoted or swung in the direction of the double arrow 15.

The outer end of the control lever 6 has an elbow or bend 50 with a ball 51, and is embodied in such a manner that during rotation of the control lever 6 about its longitudinal axis 52, there results a lever arm H as indicated in FIG. 1.

The ball 51 is a component of a ball joint having a socket 53 which is formed by the plate 31. This plate 31 is located between two rearwardly extending arms 38 which also extend in the direction of the control lever 13, as illustrated in FIG. 2. The ends of the arms 38 serve to hold a shaft 54, which in turn serves for hinged or articulated suspension of the plate 31. As a result, the plate 31 can carry out pivotal movements relative to the control lever 13 in the direction of arrow 40.

If the control lever 6 is pivoted or swung about its longitudinal axis 52, as represented by the double arrow 10 in FIG. 2, then as a consequence of the elbow or bend 50, or as a consequence of the lever arm H brought about thereby, a pivoting or swinging movement of the mirror body 4 is effected about the longitudinal axis of the pin 18. As a result, the mirror body 4 can carry out desired pitch movements.

If, on the other hand, a pivoting or swinging of the control lever 6 occurs in the direction of the arrow 11, this leads to a shifting of the pin 18 in the elongated hole 19. This results in swinging or pivoting of the pivot lever 13 about the pivot joints 14 and shaft 54 located at the lower and upper ends thereof respectively. As a result, the desired adjustments of the mirror body 4 are possible.

If the generally undesired swinging or tilting of the housing 1, with its contents, occurs to the front or rear (via the shafts 32, 33), the ball-joint connection comprising the ball 51 and the socket 53 is pull resistant in such a manner that the plate 31 can pivot or swing out of the plane of the pivot lever 13 without having to fear a loosening or release of this connection. Thus, when the housing 1 is swung or pivoted back into the position illustrated in the drawing, the position and arrangement according to FIGS. 1 and 2 again results.

As an alternative, the pivotal connection or articulated joinder of the plate 31 and of the control lever 13 can also be brought about by film or strip hinges.

The present invention is, of course, in no way restricted to the specific disclosure of the specification and drawing, but also encompasses any modifications within the scope of the appended claims.

What I claim is:

1. A rear-view mirror which is operable from the interior of a vehicle and is adjustable about a horizontal axis and a vertical axis via a control lever which is pivotable about a transverse axis and a longitudinal axis, said lever having two ends, namely a first end having a bundle which projects into said vehicle, and a second end remote from said first end; said mirror comprising:
   a housing connected to said vehicle and having an opening directed counter to the forward direction of travel of said vehicle, said housing having a base in the vicinity of said vehicle, with said base being provided with a slot;
   a mirror body adjustably arranged in said housing and substantially closing said opening thereof;
   a first ball joint pivotally connecting said mirror body to said housing in a regin remote from said vehicle;
   a pin connected to said mirror body in that region thereof closest to said vehicle, said pin being movable in said slot of said housing; said first ball joint, and said pin and cooperating slot, permitting pivotal movement of said mirror body about a vertical and horizontal axis;
   a pivot lever pivotably connected to said mirror body in the vicinity of said pin thereof;
   a plate hingedly connected with said pivot lever, with said second end of said control lever being hingedly connected with said plate; and
   a second ball joint for effecting said hinged connection of said control lever to said plate; with said second end of said control lever being bent, and with said control lever being connected to said plate, and said plate being connected to said pivot lever, in such a way that said pivot lever is pivotable as a result of rotation of said control lever, and that the angular position between said pivot lever and said control lever is variable as a result of pivoting of said control lever.

2. A mirror according to claim 1, in which, in the operating position of said mirror body and said control lever, said control lever is bent away from said mirror body.

3. A mirror according to claim 1, in which said second ball joint comprises a ball socket formed by said plate, and a ball formed by said second end of said control lever.

4. A mirror according to claim 1, in which said second ball joint forms a connection having a strength which maintains said hinged connection of said control lever to said plate, though permitting a tilting movement of said housing approximately in and counter to the forward direction of travel of said vehicle.

* * * * *